Jan. 8, 1952     W. R. HICKLER     2,581,763
BRIEFCASE AND METHOD OF MAKING SAME
Filed March 6, 1947
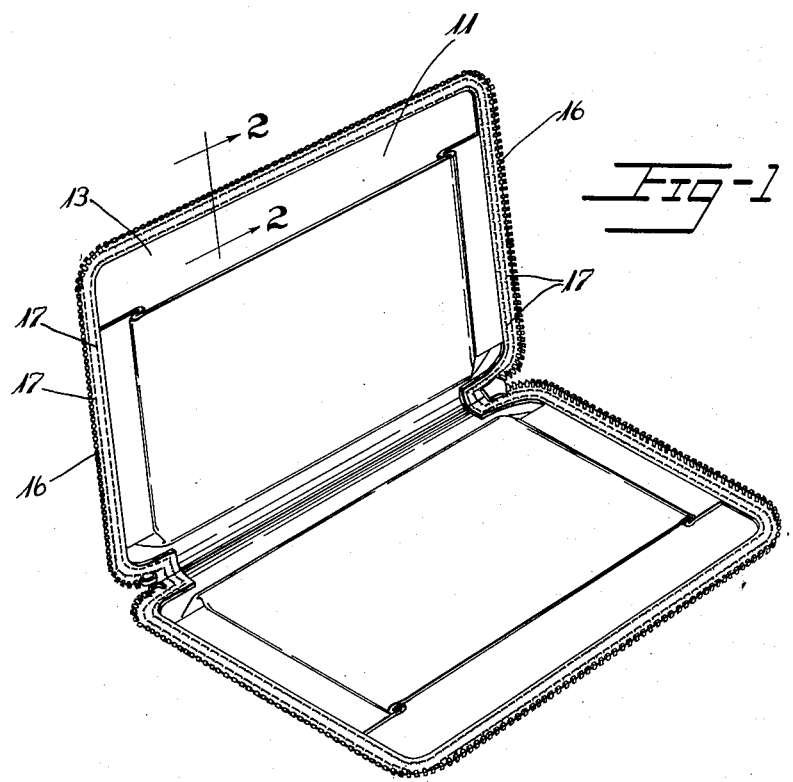
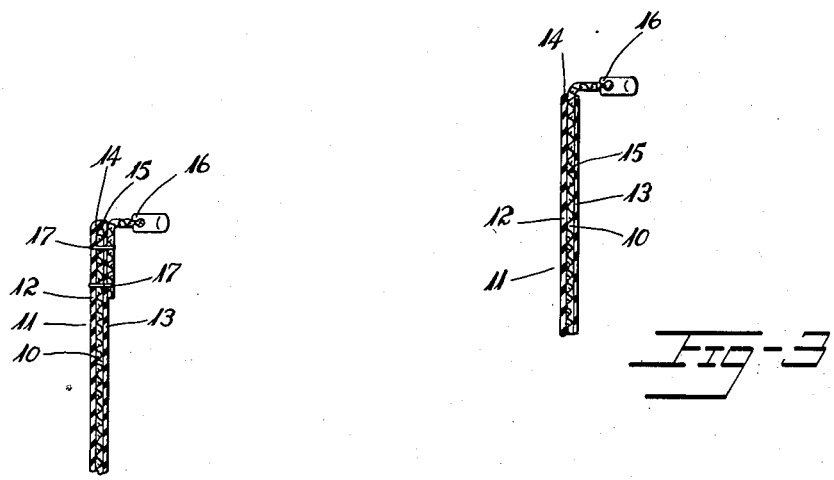
Inventor
Walter R. Hickler
By Robert W. Furlong
Atty

Patented Jan. 8, 1952

2,581,763

UNITED STATES PATENT OFFICE 2,581,763

BRIEFCASE AND METHOD OF MAKING SAME

Walter R. Hickler, Winthrop, Mass., assignor to
The B. F. Goodrich Company, New York, N. Y.,
a corporation of New York Application March 6, 1947, Serial No. 732,808

3 Claims. (Cl. 150—1.6)

This invention relates to an article of luggage such as a briefcase or the like and a method of making same and is particularly concerned with a briefcase construction having improved wear resistance.

Objects of this invention are to provide an article of pleasing appearance by means of a construction adapted to maintain the initial appearance throughout a long service life; to provide a relatively flexible reinforced article having continuous waterproof surfaces and completely enclosed edges; to provide an article in which the edges normally subject to fraying and abrasion present a continuous unbroken surface of uniform resistance; and to provide an article in which the resistant edges are integral with the surface of the body of the article and of substantially the same thickness as the body of the article. Further objects are to provide a briefcase or the like adapted to lie flat when opened and adapted to be readily closed; to provide a briefcase or the like which is flexible without being limp and which is light in weight; and to construct such an article by a method which involves a minimum number of operations which consistently result in a uniform article. Other objects will be apparent from the description which follows.

A briefcase embodying this invention comprises a generally rectangular fabric sheet completely enclosed by a layer of thermoplastic material which extends beyond the periphery of the fabric sheet in an unlaminated margin of substantially the same thickness as the body of the briefcase. The briefcase is provided with closure means which maintain the case as a closed envelope when the case is folded along a median line.

A briefcase embodying this invention is best illustrated in detail by reference to the accompanying drawings.

Of the drawings:

Fig. 1 is a perspective view of a partially opened briefcase in which the fabric body is completely enclosed by thermoplastic material;

Fig. 2 is a section on line 2—2 of Fig. 1; and

Fig. 3 is a similar section illustrating an alternative briefcase construction.

A briefcase embodying this invention as shown in Fig. 1 comprises a generally rectangular fabric body portion 10 completely enclosed by a layer 11 of thermoplastic material. The enclosing layer 11 comprises continuous covering layers 12 and 13 on the opposed surfaces of the body portion 10 fused together in an integral margin 14 extending beyond the periphery 15 of body portion 10. The body portion 10 preferably comprises a relatively flexible square-woven fabric such as cotton duck or similar textile fabric, although any relatively flexible heat-stable reinforcing material may be used. The thermoplastic material may be any flexible film-forming thermoplastic material which may be fused or molded and which is normally waterproof, abrasion resistant and not subject to flex cracking. Such materials, for example, include such compositions as plasticized polyvinyl chloride or polyvinylidene chloride, as well as mixtures of these and similar materials; a rubber such as natural rubber, a rubbery diene copolymer or a similar synthetic rubber; rubber halides, and similar materials. The thermoplastic composition may contain any of the commonly used reinforcing materials, fillers, color pigments, and softeners in accordance with conventional compounding techniques.

A closure means 16 which preferably comprises a slide fastener is secured to the outer margin of the article by lines of stitching 17, 17; so that when the body portion is folded, the complementary members of the closure means are brought into fastening relation. Other closure means may be used instead of the slide fastener, such as stud and socket fasteners, etc.

The molded margin 14 of thermoplastic material is of substantially the same thickness as the body portion 10 and covering layers 12 and 13. This cross-sectional thickness is desirable for a number of reasons. The margin has sufficient strength so that it stands out from the fabric body portion instead of hanging limply. Thus, when the briefcase edge strikes an object, the impact is taken directly on the edge where the thermoplastic layer is thickest rather than at the periphery of the fabric reinforcement where the covering layer is considerably thinner. The outstanding margin further insures abrasion directly on the edge so that the edge must be abraded back through the entire width of the margin before the fabric can fray.

Since the edge is fused or molded in a unitary structure, it exhibits no tendency to laminate. The fabric is sealed within the enclosing layer and no water can penetrate into the fabric to cause deterioration. The margin is integral with the covering layers and presents no point of incipient failure; but instead presents a finished and pleasing appearance in which the constructional details are hidden, particularly since an opaque thermoplastic composition is preferably used.

In addition to abrasion resistance, the edge of a briefcase or similar article must exhibit resistance to flexure stresses. A woven material normally has an extended flex life since the warp and weft threads are free to move relative to each other. When the woven material is coated with a thermoplastic material, however, the threads are effectively immobilized; and when the coated material is flexed, the stress is largely borne by the threads without being relieved by relative movement of the threads. The body of the article is thus relatively resistant to flexure in service, whereas the edge is relatively easily bent when it strikes an object. Relatively flexible thermoplastic material such as is employed in practicing this invention exhibits excellent resistance to flexure stress; and the outstanding margin is not weakened by repeated flexing as the marginal zone of the coated fabric would be if the outstanding margin were absent.

In constructing a briefcase embodying this invention, the preferred method comprises first providing a generally rectangular fabric sheet 10 and a pair of sheets 12 and 13 of thermoplastic material of similar shape but of slightly larger size than the fabric sheet. The fabric sheet is preferably coated with a suitable cement or latex adhesive and the thermoplastic sheets are superimposed on the opposed surfaces of the fabric sheet with the outer margins of the thermoplastic sheets extending beyond the periphery of the fabric sheet. These overlapping margins are then fused together by the application of heat sufficient to soften the margins.

In the preferred method, this step is carried out by placing the fabric sheet and superimposed covering layers in a heated mold wherein the thermoplastic material is subjected to heat and pressure sufficient to cause the material to flow in a confined space. The margin thus formed is of substantially the same thickness as the body portion including the covering layers, is integral with the covering layers, and completely encloses the fabric within an unlaminated envelope. The heat and pressure further serve to securely bond the covering layers to the fabric sheet.

Alternatively, an excess of the thermoplastic material may be disposed around the periphery of the fabric in the mold, which material is caused to fuse with the covering layers. Further, the entire covering layer and margin may be formed in the mold by placing a suitable quantity of the thermoplastic material on each side of the fabric and fusing said material to form a covering sheet but it is difficult to obtain a covering layer of uniform thickness unless the thermoplastic material is employed in sheet form.

The enclosed body portion is then cooled and removed from the mold. A slide fastener is secured around the periphery of the article by stitching or otherwise securing the stringer tape of the fastener to the enclosed article. Thus, when the article is folded along a median line, the complementary members of the slide fastener are brought into fastening relation.

If desired, a design or grain may be molded on the surface of the thermoplastic at the same time the margin is formed. It is also preferable to form a rounded edge on the margin to present a finished appearance as shown in the drawing. Subsequently, pockets, etc., may be stitched or cemented inside the briefcase in the usual manner if desired.

In an alternative construction as shown in Fig. 3, the briefcase is prepared as before prior to the molding operation. At this point, the slide fastener tape is disposed between the overlapping margins of the covering layer in abutting relation to the edge of the fabric sheet 10, and the whole assembly is molded under heat and pressure so as to secure the slide fastener within the margin of the completed article. If desired, the stringer tape may be first butt stitched to the fabric to insure registry of the parts during the molding operation.

The methods detailed heretofore are particularly applicable in making an improved briefcase, but are also applicable for making other articles such as keycases, notebook binders, billfolds, suitcases and similar articles which must have abrasion resistant edges and which are preferably relatively flexible.

An article prepared in accordance with this invention is relatively flexible but has sufficient body to maintain its shape. The article has a continuous waterproof surface sealing in the reinforcing fabric body and preventing deterioration or fraying of the fabric. The fused margin of the article presents an abrasion resistant edge which maintains a pleasing appearance throughout a long service life. The margin of the article is integral with the surface covering layer and presents no weak point subject to failure. The article is easily constructed by a few simple operational steps involving no special or complex equipment and the method of making the article insures consistently uniform results.

A few preferred embodiments of the invention have been described in detail together with the preferred methods of making same, but it will be understood that further variations and modifications may be effected within the spirit and scope of the invention as defined in the appended claims.

I claim:

1. Briefcase comprising a generally rectangular sheet of textile fabric, covering layers of flexible thermoplastic material overlying the surfaces of said sheet and bonded thereto, the outer margins of said covering layers extending beyond the periphery of said sheet along the extent thereof and having disposed therebetween and bonded thereto a margin of a slide fastener tape having fastener elements disposed along its opposite margin, said fabric sheet and covering layers therefor being adapted to be folded across one dimension thereof to bring the fastener elements of said slide fastener into fastening relation along the extent of said fastener.

2. The method of constructing a briefcase which comprises providing a generally rectangular textile fabric body portion, providing cover layers for said body portion comprising thermoplastic material, disposing said cover layers over the opposed faces of said body portion and adhering said layers thereto with the outer margins of said layers extending beyond the periphery of said body portion along the extent thereof, providing a slide fastener comprising complementary fastening members mounted on stringer tape adapted to extend around the periphery of the body portion, disposing a margin of said tape between the outer margins of said cover layers, and subjecting at least the outer margins of the assembly to heat and pressure sufficient to bond said margins to said fastener tape.

3. An article of luggage having a wall member comprising a base member of textile fabric and a covering layer of flexible thermoplastic material overlying each face of said base member and bonded thereto, an outer marginal portion of said covering layers extending beyond the periphery of said base member along an edge thereof, a slide fastener comprising a plurality of locking elements mounted along a margin of a flexible tape, the free margin of said tape abutting the edge of said base member between the marginal portions of said covering layers and being bonded to each of said covering layers along its extent.

WALTER R. HICKLER.

REFERENCES CITED

The following references are of record in the file of this patent:

UNITED STATES PATENTS

| Number | Name | Date |
|---|---|---|
| 1,641,871 | Solomon | Sept. 6, 1927 |
| 2,001,693 | Rockwood | May 14, 1935 |
| 2,053,630 | Plotkin | Sept. 8, 1936 |
| 2,167,634 | Calvert | Aug. 1, 1939 |
| 2,190,628 | Sundback | Feb. 13, 1940 |
| 2,201,198 | Monro et al. | May 21, 1940 |
| 2,235,981 | Coe et al. | Mar. 25, 1941 |
| 2,368,911 | Andler | Feb. 6, 1945 |
| 2,397,743 | Kaphan | Apr. 2, 1946 |
| 2,438,615 | Morin | Mar. 30, 1948 |
| 2,442,044 | Howard | May 25, 1948 |
| 2,455,215 | Beckwith et al. | Nov. 30, 1948 |

FOREIGN PATENTS

| Number | Country | Date |
|---|---|---|
| 335,145 | Great Britain | Sept. 18, 1930 |
| 540,414 | Great Britain | Oct. 16, 1941 |